United States Patent [19]
Russ, Sr.

[11] 3,887,242
[45] June 3, 1975

[54] SLIDE BAR FOR A TRACK SUSPENSION SYSTEM

[75] Inventor: Paul E. Russ, Sr., Englewood, Colo.

[73] Assignee: The Gates Rubber Company, Denver, Colo.

[22] Filed: Mar. 22, 1971

[21] Appl. No.: 126,811

[52] U.S. Cl. .................. 305/24; 180/5 R; 280/28
[51] Int. Cl. ............................................ B62d 55/10
[58] Field of Search .......... 180/5 R; 280/28; 305/24

[56] References Cited
UNITED STATES PATENTS

| | | |
|---|---|---|
| 2,339,886 | 1/1944 | Shannon .............................. 180/5 R |
| 2,824,746 | 2/1958 | Shummer .............................. 280/28 |
| 3,120,963 | 2/1964 | Seckel .................................. 280/28 |
| 3,545,821 | 12/1970 | Erickson ............................ 180/5 R |

*Primary Examiner*—Philip Goodman
*Attorney, Agent, or Firm*—H. W. Oberg, Jr.; Raymond Fink; Curtis H. Castleman, Jr.

[57] ABSTRACT

A slide bar of a suspension system for supporting a flexible and endless track. The slide bar has at least one groove on its track engaging surface to accumulate a lubricant or provide an egress for foreign particles that may lodge between the slide bar and track.

7 Claims, 6 Drawing Figures

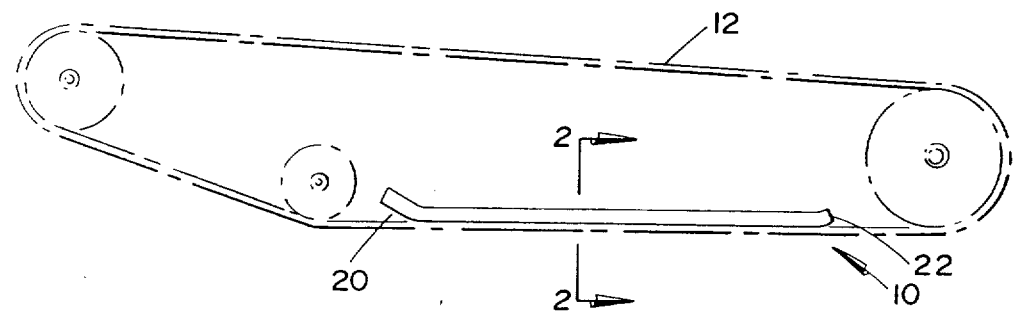
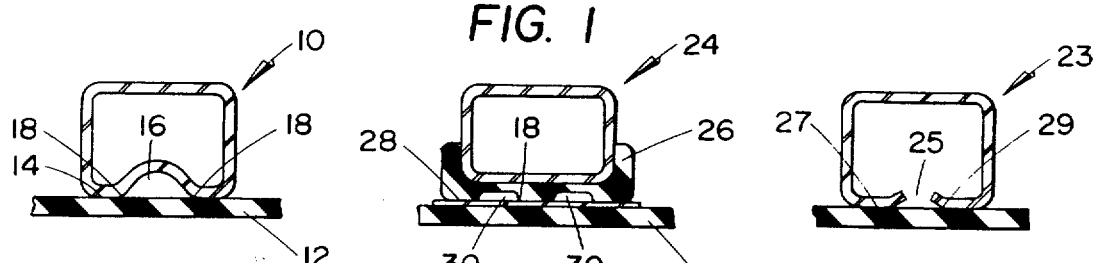
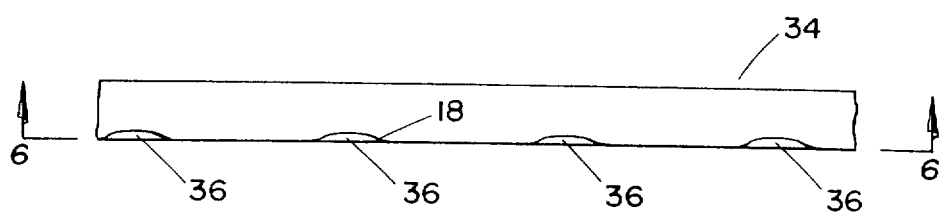
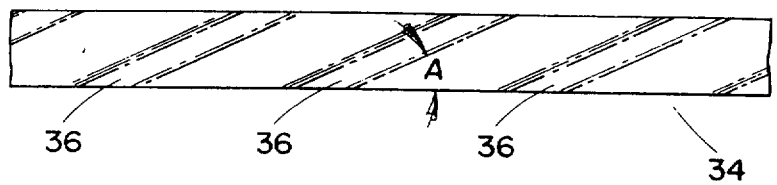
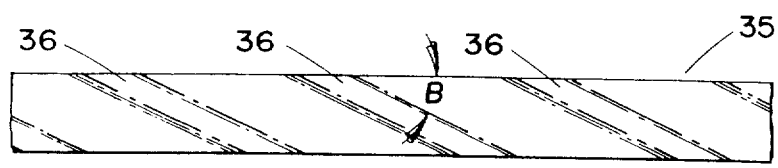
INVENTOR
PAUL E. RUSS SR.
BY H H Oberg Jr
ATTORNEY

SLIDE BAR FOR A TRACK SUSPENSION SYSTEM

BACKGROUND OF THE INVENTION

The invention relates to wheel substitutes for land vehicles, but more particularly, the invention relates to slide bar suspension systems for supporting flexible track such as employed on snowmobiles or all-terrain vehicles.

It is recognized as being advantageous to support flexible tracks with slide bars. In comparison to the rolling point of contact provided by a wheel suspension system, a slide bar inherently has a greater contact area for supporting a track. The greater contact area furnishes a degree of stability to the track. Examples of slide bar suspension systems are: U.S. Pat. No. 3,485,312 as issued to Swenson et al.; U.S. Pat. No. 3,527,505 as issued to Hetten; and U.S. Pat. No. 3,527,506 as issued to Erickson. Although a slide bar suspension system offers improved stability to a track, it also invites a problem of sliding friction that causes rapid wearing of the track or slide bar. To overcome the sliding friction problem, some suspension systems have a friction reducing plastic shoe which covers a slide bar. The plastic shoe typically engages a plurality of metal elements embedded in or attached to a track. Other slide bar systems have a metal slide bar which engages a track of a friction reducing polymeric material. This invention is directed toward further reducing sliding friction which occurs between a slide bar and a track.

SUMMARY OF THE INVENTION

An improved slide bar support for an endless track is provided that further reduces sliding friction between the slide bar and track. The slide bar has at least one groove formed in its track engaging or supporting surface. The groove may be longitudinally or obliquely aligned in relation to the slide bar. The groove furnishes means for entrapping lubricous terrain such as snow or ice. Should the slide bar be used over abrasive terrain, the groove provides an egress for the abrasive.

Accordingly, it is an object of the invention to provide a slide bar having friction reducing means for a slide type suspension system.

Another object of the invention is to provide a slide bar for a track support system where friction between the track and slide bar is reduced as the track is used over lubricous terrain.

Another object of the invention is to provide a support for a track which has a slide bar having an egress for removing abrasive terrain from between the slide bar and track.

Yet another object of the invention is to provide a slide bar having means for entrapping lubricous terrain between the slide bar and a vehicle track.

These and other objects or advantages will become apparent by reviewing the drawings and description thereof wherein:

FIG. 1 is a side view of a track and a slide bar of the invention.

FIG. 2 is a view taken along the lines 2—2 of FIG. 1.

FIG. 3 is a cross-sectional view similar to FIG. 2 but showing an alternate form of the invention.

FIG. 4 is a cross-sectional view similar to FIG. 2 showing another alternate form of the invention.

FIG. 5 is a side view of another embodiment of the invention.

FIG. 6 is a bottom view taken along the lines 5—5 of FIG. 5.

DESCRIPTION OF PREFERRED EMBODIMENT

Referring to FIGS. 1 and 2, a slide bar 10 of the invention is shown in relation to a flexible and endless track 12. The slide bar may be mounted or suspended from a vehicle, not shown, in any desired manner to support the track in any desired fashion. The slide bar is mounted to be aligned substantially longitudinally in relation to the track. One or more slide bars may be used in any favorable combination. For example, the slide bar or bars may be suspended for: constant engagement with the track, as shown; intermittent engagement with the track; or selectively moved for engagement with the track. The slide bar 10 may have any desired cross section and shape. Each slide bar of the invention has a track engaging surface 14 in which is formed at least one longitudinal groove 16 or channel. The purpose of the groove 16 is to reduce the friction between the slide bar and track especially when they are used over lubricous terrain such as snow. The groove may have any cross-sectional shape. However, it is preferred to have the edges 18 of the groove radiused near the track engaging surface 14 of the slide bar 10. A radiused edge eliminates the possibility of having a high pressure contact area that could cause undesirable track wear.

When a tracked vehicle having a slide bar of the invention is operated over lubricous terrain such as snow, a quantity of snow is pulled into the groove by the moving track, moving in relation to the slide bar. The groove provides a place to entrap and accumulate the snow. Continued operation of the vehicle further packs snow in the groove and heat generated by the track sliding against the slide bar changes the packed snow to ice. The ice provides a low coefficient of friction surface for sliding against the slide bar engaging surface of the track. The high heat capacity of the ice maintains slide bar and track temperatures to a minimum.

The advantage of the slide bar groove is also realized when a tracked vehicle is operated over abrasive terrain such as dirt or sand. The groove 16 provides an egress for any dirt or sand which might accumulate between the track and the slide bar.

Here, the importance of a groove 16 open at the front 20 and rear 22 of the slide bar 10 should be noted. The frontal opening allows lubricous terrain to enter and accumulate. The rearward opening provides an egress for abrasive terrain. Were the frontal opening to be blocked, there would be less likelihood for lubricous terrain to enter. Were the rearward opening to be blocked, abrasive terrain could accumulate as there would be no exit.

ADDITION SPECIES

Heretofore, the combination of a metal slide bar engaging a polymeric track is depicted. The slide bar of the invention also includes the combination of a polymeric surface of the slide bar engaging a metal surface or surfaces of the track. Referring to FIG. 3, a slide bar 24 is shown including a polymeric shoe 26 attached thereto as a track engaging surface 28. One or more grooves 30 are formed in the shoe 26 to reduce sliding friction between the slide bar and track 32 in the manner as previously explained.

Referring to FIG. 4, a slide bar 23 similar to that of FIG. 2 is shown. A groove 25 is formed in the track engaging surface 27 of the slide bar. The edges 29 of the groove are radiused to form a smooth transition from the track engaging surface 27. The groove 25 as formed in the slide bar 23 reduces sliding friction between the slide bar and track in the manner as previously explained.

Referring now to FIGS. 5 and 6, an alternate form of the invention is provided. The slide bars 34, 35 have a plurality of grooves 36 formed in the track engaging surface. The grooves 36 are obliquely aligned in relation to the slide bar. Preferably, the grooves 36 are arranged at generally equal but opposite angles A, B from the slide bars 34, 35. The obliquely arranged grooves provide means for moving loose terrain toward or away from the center of a track with which the slide bars are used. Should a track be moved in the direction L in relation to the slide bars, loose terrain is channeled through the grooves 36 toward a position located between the slide bars 34, 35. Should a track be moved in the direction R in relation to the slide bars, loose terrain is channeled away from the slide bars 34, 35. Thus, the grooves 36 may be selectively aligned to influence the direction of movement of loose terrain in the area of the grooves. The grooves reduce sliding friction between the slide bar and a track in the presence of lubricous or abrasive terrain in a manner as previously explained.

The foregoing detailed description was made for the purpose of illustration only and is not intended to limit the scope of the invention which is to be determined from the appended claims.

What is claimed is:

1. In a wheel substitute land vehicle of the type having at least one endless track with an inner surface, frame means for suspending the track from the vehicle, and means in cooperation with the frame means for supporting the inner surface of the track, wherein improvement in the support means comprises:
   at least one slide bar suspended from the frame means to be in substantially longitudinal alignment in relation to the track, said slide bar having a track engaging surface for engaging and supporting the track along the inner surface, the track engaging surface having at least one groove which defines edges near the track engaging surface.

2. A support as set forth in claim 1 wherein the groove is substantially longitudinal in relation to the slide bar.

3. A support as set forth in claim 1 wherein the edges of the groove are radiused.

4. A support as set forth in claim 1 wherein the track engaging surface of the slide bar is of a polymeric material.

5. In a wheel substitute land vehicle of the type having at least one endless track with an inner surface, frame means for suspending the track from the vehicle, and means in cooperation with the frame means for supporting the inner surface of the track, wherein improvement in the support means comprises:
   at least two slide bars mounted to the frame means and arranged to define a pair which are substantially parallel with each other,
   said slide bars having a plurality of obliquely aligned grooves in the track engaging surfaces, the grooves of one slide bar forming a generally equal but opposite angle with the grooves of its paired slide bar.

6. A wheel substitute land vehicle of the type having at least one endless track with an inner surface, frame means for suspending the track from the vehicle, and means in cooperation with the frame means for supporting the inner surface of the track, wherein improvement in the support means comprises:
   at least one generally tubular and hollow slide bar suspended from the frame means to be substantially in longitudinal alignment with the track,
   said slide bar having a track engaging surface that engages and supports the track, and the track engaging surface having at least one longitudinal groove extending from the track engaging surface into the hollow of the slide bar.

7. In a wheel substitute land vehicle of the type having at least one endless track with an inner surface, frame means for supporting the track from the vehicle, and means in cooperation with the frame means for supporting the inner surface of the track, wherein improvement in the support means comprises:
   at least one slide bar suspended from the frame means to be in substantially longitudinal alignment in relation to the track, said slide bar having a track engaging surface for engaging and supporting the track along the inner surface, the track engaging surface having at least one groove obliquely aligned in relation to the slide bar.

* * * * *